United States Patent
Kim et al.

(10) Patent No.: US 10,479,912 B2
(45) Date of Patent: Nov. 19, 2019

(54) DOUBLE-SIDED ADHESIVE SHEET AND DISPLAY DEVICE FOR TOUCH PANEL INCLUDING SAME

(75) Inventors: Jang-Soon Kim, Seongnam-si (KR); James Jung, Seoul (KR); Sang-Hun Choi, Chungcheongbuk-do (KR); Young-Myung Gee, Daejeon (KR); Hyung-Min Cha, Cheongju-si (KR); No-Woong Park, Seoul (KR); Se-Hee Park, Gumi-si (KR); Hyun-Ju Cho, Gunpo-si (KR)

(73) Assignee: LG Chem, Ltd. (KR)

( * ) Notice: Subject to any disclaimer, the term of this patent is extended or adjusted under 35 U.S.C. 154(b) by 1004 days.

(21) Appl. No.: 13/988,126

(22) PCT Filed: Nov. 11, 2011

(86) PCT No.: PCT/KR2011/008601
§ 371 (c)(1),
(2), (4) Date: May 17, 2013

(87) PCT Pub. No.: WO2012/070791
PCT Pub. Date: May 31, 2012

(65) Prior Publication Data
US 2013/0241862 A1 Sep. 19, 2013

(30) Foreign Application Priority Data
Nov. 22, 2010 (KR) .................. 10-2010-0116342

(51) Int. Cl.
*C09J 7/02* (2006.01)
*C09J 7/22* (2018.01)
*C09J 7/38* (2018.01)

(52) U.S. Cl.
CPC . *C09J 7/22* (2018.01); *C09J 7/38* (2018.01); *C09J 2201/134* (2013.01);
(Continued)

(58) Field of Classification Search
CPC combination set(s) only.
See application file for complete search history.

(56) References Cited

U.S. PATENT DOCUMENTS

| 2003/0232192 A1* | 12/2003 | Kishioka | C09J 7/02 428/354 |
| 2004/0191509 A1* | 9/2004 | Kishioka | B32B 7/10 428/354 |

(Continued)

FOREIGN PATENT DOCUMENTS

| JP | 2003238915 A | 8/2003 |
| JP | 2004292493 A | 10/2004 |

(Continued)

OTHER PUBLICATIONS

International Search Report dated Jun. 28, 2012 for PCT/KR2011/008601.

(Continued)

*Primary Examiner* — Samir Shah
(74) *Attorney, Agent, or Firm* — Lerner, David, Littenberg, Krumholz & Mentlik, LLP

(57) ABSTRACT

The embodiment examples of the present invention relate to a double-sided adhesive sheet and a display device for a touch panel including the same. The double-sided adhesive sheet, according to the embodiment examples of the present invention, comprises a transparent acryl-based resin layer as a substrate, can provide a double-sided adhesive sheet which can be detached and recycled after attaching to the touch panel and a display device module, by means of the adhesive agent layers that are formed on both sides having different detaching force, can improve visibility of the display device by being coupled between the touch panel and the display device module for eliminating an air gap, and can minimize the difference in the bending rate of each layer of the (Continued)

double-sided adhesive sheet for eliminating visibility exhaustion as much as possible.

14 Claims, 1 Drawing Sheet

(52) U.S. Cl.
CPC ...... *C09J 2203/318* (2013.01); *C09J 2433/00* (2013.01); *C09J 2433/006* (2013.01); *Y10T 156/10* (2015.01); *Y10T 428/24942* (2015.01); *Y10T 428/24959* (2015.01); *Y10T 428/2843* (2015.01); *Y10T 428/2848* (2015.01)

(56) References Cited

U.S. PATENT DOCUMENTS

| | | | |
|---|---|---|---|
| 2005/0019560 A1* | 1/2005 | Hesse | C08G 18/227 428/355 N |
| 2005/0202238 A1 | 9/2005 | Kishioka et al. | |
| 2008/0248299 A1* | 10/2008 | Kuwahara | C09J 133/04 428/355 R |

FOREIGN PATENT DOCUMENTS

| | | |
|---|---|---|
| JP | 2009227826 A | 10/2009 |
| KR | 20040030187 A | 4/2004 |
| KR | 1020060043847 | 11/2005 |
| KR | 20060021167 | 3/2006 |
| KR | 100740988 | 7/2007 |
| KR | 20090103537 | 10/2009 |
| KR | 20100008580 A | 1/2010 |

OTHER PUBLICATIONS

Japanese Office Action dated May 20, 2014.
Extended European Search Report for Application No. EP11843505.6 dated Jul. 21, 2017.

* cited by examiner

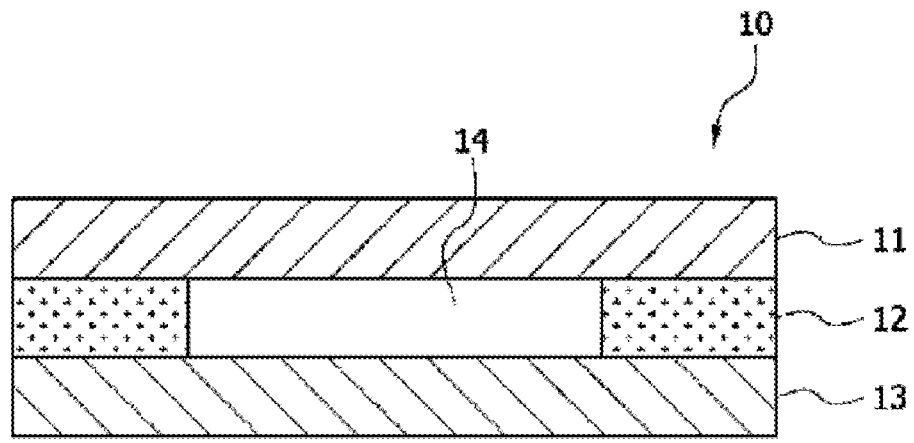
[Fig1]
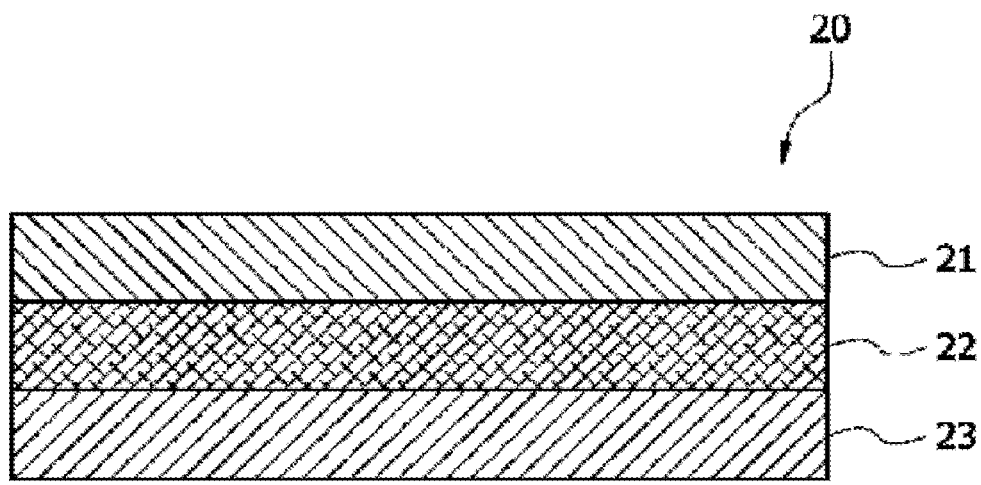
[Fig2]
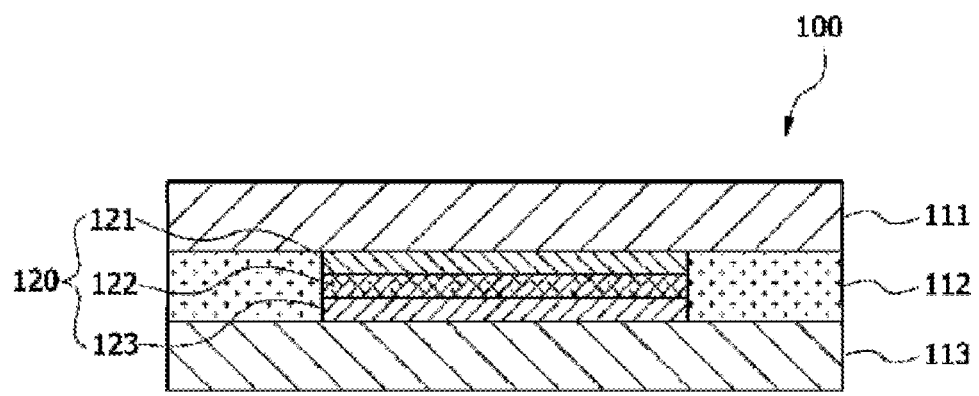
[Fig3]

DOUBLE-SIDED ADHESIVE SHEET AND DISPLAY DEVICE FOR TOUCH PANEL INCLUDING SAME

CROSS REFERENCE TO RELATED APPLICATION

This application claims the priority of Korean Patent Application No. 10-2010-0116342, filed on Nov. 22, 2010 in the KIPO (Korean Intellectual Property Office). Further, this application is the National Phase application of International Application No. PCT/KR2011/008601 filed on Nov. 11, 2011, which designates the United States and was published in Korean.

TECHNICAL FIELD

Embodiments of the present invention relate to a double-sided adhesive sheet and a touch panel type display device including the same.

BACKGROUND ART

In recent years, the market for electronic devices, such as mobile communication terminals, PDAs (Personal Digital Assistants), and auto navigation systems has expanded through the development of various electronic devices having various functions. In order obtain a thin structure with a large display area, most recent electronic devices employ a touch panel display, enabling an increase in display area and providing a user friendly input means. In particular, with rapid expansion of the smartphone market, demand for touch panel type display devices has increased.

Specifically, a touch panel is a device that functions as a data input unit used in a variety of office devices such as computers, word processors or personal digital assistants, and is now considered an essential feature in a variety of electronic devices in consideration of modern emphasis on usability. In particular, the touch panel is incorporated into a display device for displaying data so as to allow intuitive manipulation thereof.

Touch panels include a resistive layer type, an optical type, electrostatic capacitive type, ultrasound wave type, and the like. Among these, the resistive layer type touch panel and the electrostatic capacitive type touch panel are generally used.

Such a touch panel is secured to a display device module via a pressure-sensitive adhesive layer formed in a lattice shape along an edge of the display device module. FIG. 1 is a schematic sectional view of a conventional touch panel type display device. Referring to FIG. 1, a touch panel 11 is coupled to a display device module 13 via a pressure sensitive adhesive layer 12 to constitute a touch panel type display device 10. In this structure, however, an air gap 14 is present between the touch panel 11 and the display device module 13, causing deterioration in visibility through increase in reflectivity.

In order to solve such a problem in the art, the touch panel can be directly bonded to a liquid crystal display module using a double-sided adhesive sheet. However, when a conventional pressure-sensitive double-sided adhesive sheet is used in the air gap 14, the display device module 13 and the touch panel 11 cannot be separated from each other in the event that repairs need to be made, causing the expensive display device module to be discarded.

Therefore, there is a need for a double-sided adhesive sheet, which can improve visibility of a display device by eliminating an air gap between a touch panel and a display device module, and can ensure that the touch panel and the display device can be properly reattached therethrough after separation from one another.

DISCLOSURE

Technical Problem

An aspect of the present invention is to provide a double-sided adhesive sheet.

Another aspect of the present invention is to provide a touch panel type display device including the double-sided adhesive sheet.

A further aspect of the present invention is to provide a method of securing a touch panel to a display device module using the double-sided adhesive sheet.

Technical Solution

In accordance with one aspect of the present invention, a double-sided adhesive sheet sequentially includes a first adhesive layer, a transparent acrylic resin layer and a second adhesive layer, wherein each of the first adhesive layer and the second adhesive layer includes an acrylic adhesive; the first adhesive layer is disposed to adjoin a touch panel; the second adhesive layer is disposed to adjoin a display device module; and adhesive strength between the first adhesive layer and the touch panel is higher than adhesive strength between the second adhesive layer and the display device module.

In accordance with another aspect of the present invention, there is provided a touch panel type display device including the double-sided adhesive sheet, wherein the first adhesive layer of the double-sided adhesive sheet is bonded to a front side of the touch panel, the second adhesive layer of the double-sided adhesive sheet is bonded to a front side of a display device module, and the double-sided adhesive sheet is peelable and re-bondable to the touch panel or the display device module.

In accordance with a further aspect of the present invention, a method of securing a touch panel to a display device module using the double-sided adhesive sheet includes bonding the second adhesive layer of the double-sided adhesive sheet to the display device module; and bonding the first adhesive layer of the double-sided adhesive sheet to the touch panel.

Embodiments of the present invention will be described in more detail with reference to the accompanying drawings. Further, in the description of the present invention, descriptions of detailed functions or configurations apparent to those skilled in the art will be omitted. Further, the accompanying drawings schematically illustrate features of the present invention to aid in understanding of the invention, and unnecessary portions have been omitted therein. Further, it should be noted that the accompanying drawings are exaggerated in thickness of lines or size of components for descriptive convenience and clarity, and that the present invention is not limited by the thickness, size and scale of the components shown in the drawings.

FIG. 2 is a schematic sectional view of a double-sided adhesive sheet in accordance with one embodiment of the present invention. Referring to FIG. 2, a double-sided adhesive sheet 20 according to one embodiment sequentially includes a first adhesive layer 21, a transparent acrylic resin layer 22, and a second adhesive layer 23.

The first adhesive layer 21 is disposed to adjoin a touch panel and the second adhesive layer 23 is disposed to adjoin a display device module.

In some embodiments, the double-sided adhesive sheet 20 may be used to securely bond a touch panel, which includes a substrate, for example, a lower substrate comprised of an organic or inorganic material such as polycarbonate, polymethyl methacrylate, glass or SUS, to a display device module having a polarizing film at the uppermost portion thereof, without being limited thereto.

The double-sided adhesive sheet 20 is prepared by coating adhesives having different peeling strengths on both sides of the transparent acrylic resin layer 22, such that adhesive strength between the first adhesive layer and the touch panel is higher than adhesive strength between the second adhesive layer and the display device module.

More specifically, the first adhesive layer 21 may have a 180° peeling strength of 800 to 3000 g/in with respect to a substrate at a peeling speed of 300 mm/min and a temperature of 23° C. If the first adhesive layer 21 has a 180° peeling strength of less than 800 g/in, there is a problem of deterioration in reworkability and durability, and if the first adhesive layer has a 180° peeling strength exceeding 3000 g/in, there is a possibility of adhesive residue formation.

The second adhesive layer 23 may have a 180° peel strength of 0 to 80 g/in, with respect to a polarizing film, for example, an acrylate resin such as triacetylcellulose (TAC) resins, cyclopolyolefin resins, polymethyl methacrylate resins and the like, at a peeling speed of 300 mm/min and a temperature of 23° C. If the second adhesive layer 23 has a 180° peel strength of greater than 80 g/in, there is a problem of low reworkability, and even in the case where the second adhesive layer has a 180° peel strength of 0, reworking is allowed when there is a physical contact due to tack of the second adhesive layer.

The double-sided adhesive sheet 20 according to embodiments of the invention includes the transparent acrylic resin layer 22 as a base film. Although a variety of transparent base films are known in the art, all of the base layer 22 and the first and second adhesive layers 21, 23 according to the embodiments of the invention are formed of an acrylic material in order to improve visibility by eliminating differences in index of refraction therebetween. When the first adhesive layer, the transparent acrylic resin layer and the second adhesive layer have difference indexes of refraction, improvement in visibility cannot be achieved due to optical distortion and deterioration in optical performance. Therefore, it is advantageous that the first and second adhesive layers and the transparent acrylic adhesive resin layer have similar indices of refraction. More specifically, the first adhesive layer, the transparent acrylic resin layer and the second adhesive layer may have an index of refraction of 1.44~1.55.

The transparent acrylic resin layer 22 may be formed of any acrylic resin having at least one double bond in the molecule structure, such as methyl methacrylate, urethane acrylate, epoxy acrylate, silicone acrylate, ethylhexyl acrylate, butyl acrylate, ethyl acrylate, isobonyl acrylate, cyclohexyl methacrylate, glycidyl methacrylate, glycidyl acrylate, behenyl acrylate, ethyl acrylate, lauryl acrylate, stearyl acrylate, acrylic acid, hydroxyethyl acrylate, hydroxybutyl acrylate, hydroxyethyl methacrylate, phenoxy acrylate, methylacrylate, hexanediol diacrylate, and the like. The acrylic resin for the transparent acrylic resin layer may be prepared, in the form of a polymer, by mixing a polymerized resin with a monomer, or by mixing a polymerized resin with a solvent. Here, the acrylic resin may be selected from suitable acrylic resins having a certain degree of transparency that does not deteriorate visibility of a display device.

Both the first adhesive layer 21 and the second adhesive layer 23 may employ acrylic adhesives having a certain degree of transparency that does not deteriorate visibility of the display device.

In addition, an acrylic adhesive for forming the first adhesive layer 21 may be formed of an acrylic copolymer, which includes an acrylate monomer having a $C_1$-$C_{12}$ alkyl group and a functional group-containing copolymerizable monomer in order to secure durability and adhesion, wherein the functional group-containing monomer is present in an amount of 5 wt % to 30 wt % in the acrylic copolymer. If the amount of the functional group-containing monomer is less than 5 wt %, the peel strength of the acrylic adhesive is decreased, and if the amount of the functional group-containing monomer exceeds 30 wt %, the adhesive is overly hardened, thereby making it difficult to relieve steps formed by printing, if any.

In addition, an acrylic adhesive for forming the second adhesive layer 22 may be formed of an acrylic copolymer, which includes an acrylate monomer having a $C_1$-$C_{12}$ alkyl group and a functional group-containing copolymerizable monomer in order to ensure reworkability and adjustment of a crosslinking degree, wherein the functional group-containing monomer is present in an amount of 1 wt % to 5 wt % in the acrylic copolymer. If the amount of the functional group-containing monomer is less than 1 wt %, the acrylic adhesive exhibits poor cohesion and, as such, adhesive residue is likely to remain upon reworking. If the amount of the functional group-containing monomer exceeds 5 wt %, the adhesive exhibits high peel strength, causing deterioration in reworkability.

With the composition of the acrylic adhesives for the first and second adhesive layers as described above, it is possible to provide an index of refraction within a certain range. This range is the same as the range of the index of refraction of the transparent acrylic resin layer, thereby minimizing difference in index of refraction between the adhesive layers and the transparent acrylic resin layer. More specifically, although the first adhesive layer, the transparent acrylic resin layer and the second adhesive layer are arranged in a stack structure, the difference in index of refraction therebetween is minimized, whereby the first adhesive layer, the transparent acrylic resin layer and the second adhesive layer can act as a single layer, preventing optical distortion.

Examples of the acrylate monomer having a $C_1$-$C_{12}$ alkyl group include methyl (meth)acrylate, ethyl (meth)acrylate, propyl(meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, and dodecyl (meth)acrylate. These monomers may be used alone or in combination.

Further, the acrylic polymer may include a monomer (that is, a copolymerizable monomer) copolymerizable with the acrylate monomer having a $C_1$-$C_{12}$ alkyl group. In particular, in crosslinking of the acrylic polymer, a modification monomer for modification of the acrylic adhesive is advantageously used as the copolymerizable monomer. Examples of the modification monomer may include any monomer known as modification monomers. The copolymerizable monomers may be used alone or in combination of two or more thereof.

Specifically, examples of the copolymerizable monomer include copolymerizable monomers having various functional groups (functional group-containing copolymerizable monomers); styrene monomers such as styrene; and α-olefin monomers such as ethylene and propylene. Examples of the functional group-containing copolymerizable monomer include vinyl esters such as vinyl acetate; cyano group-containing copolymerizable monomers such as (meth)acrylonitrile; amide group-containing copolymerizable monomers such as (meth)acrylamide or N,N-dimethyl (meth)acrylamide; hydroxyl group-containing copolymerizable monomers such as 2-hydroxyethyl (meth)acrylate, 3-hydroxypropyl (meth)acrylate, 4-hydroxy butyl (meth)acrylate or 6-hydroxyhexyl (meth)acrylate; epoxy group containing copolymerizable monomers such as glycidyl (meth)acrylate; amino group-containing copolymerizable monomers such as N,N-dimethylaminoethyl (meth)acrylate alkyl ester; and carboxyl group-containing copolymerizable monomer such as (meth)acrylic acid, crotonic acid, itaconic acid, maleic acid, anhydrous maleic acid, or fumaric acid.

As to the monomer for modification of the acrylic adhesive, any functional group-containing copolymerizable monomer may be used. Particularly, a hydroxyl group-containing copolymerizable monomer or a carboxyl group-containing copolymerizable monomer is preferably used. More preferably, acrylic acid is used. Further, the acrylic polymer may be obtained through crosslinking with a functional group (particularly, a polar functional group) derived from the monomer for modification of the acrylic adhesive.

In the double-sided adhesive sheet 20 according to the embodiments of the invention, the first adhesive layer 21 may be formed to have a greater thickness than the second adhesive layer 23 in order to allow the first adhesive layer 21 and the second adhesive layer 23 to exhibit different peeling strength. In order to form the first and second adhesive layers 21, 23 to different thicknesses, for example, the first adhesive layer 21 having a greater thickness may be formed of a solventless adhesive composition. This is because the use of a solvent in formation of the adhesive layer can make it difficult to form an adhesive layer having a predetermined thickness or more while achieving desired properties of the first adhesive layer 21.

In a process of forming the first adhesive layer, an acrylic monomer and a thermal initiator are mixed and stirred in a reactor, followed by heating the mixture to about 60° C. such that polymerization proceeds while the thermal initiator forms free radicals. Then, in order to induce partial polymerization, oxygen bubbling is performed once a viscosity of 1000~5000 cps is reached through polymerization, that is, when the mixture becomes suitable for coating, and a polymerization inhibitor is then added to finish the reaction. Then, the partially polymerized resin is mixed with a photo initiator and a photo curing agent to produce an adhesive composition, which in turn is coated on a substrate and subjected to photocuring to form an adhesive layer having a desired thickness.

In a process of forming the second adhesive layer, a solvent type adhesive composition is used to form the second adhesive layer having a relatively thin thickness. This is because it is desirable for the second adhesive layer to have a thin thickness and the use of a solventless adhesive composition can result in non-uniform thickness. In a process of forming an adhesive layer using a solvent type adhesive composition, for example, an acrylic monomer and a heat initiator are mixed with a solvent such as ethyl acetate, and stirred at a temperature of 60° C. to prepare a polymer adhesive layer having a conversion rate of about 85% or more. Then, a curing agent is added to the polymer adhesive layer formed as above, followed by coating the resultant to a desired thickness and drying with hot air to form the second adhesive layer. For complete curing of the second adhesive layer, aging is performed at about 40° C. for at least 1 day.

As the adhesive composition for the first adhesive layer, any adhesive composition may be used so long as the composition can impart 180° peel strength, and any functional group may be used with respect to a surface of an adherend, which can avoid corrosion, without limitation. The peel strength of the second adhesive layer may be adjusted through adjustment of the contents of the curing agent and the functional group, molecular weight of the polymer resin, and glass transition temperature. In order to ensure good reworkability by maintaining relatively low peel strength, the composition for the second adhesive layer is advantageously free from acrylic acid exhibiting high adhesive strength and may include a monomer having at least one functional group, such as a hydroxyl group and an amide group. Further, in order to improve reworkability of the second adhesive layer, the polymer adhesive resin may have a weight average molecular weight ranging from 500,000 to 1,500,000. Within this range of the weight average molecular weight, adhesive residue is unlikely to remain and wettability after adhesion can be maintained, thereby preventing slight separation of the second adhesive layer.

The first adhesive layer 21 may have a thickness ranging from 50 μm to 250 μm, preferably from 50 μm to 150 μm. Within this thickness range, the first adhesive layer 21 can be easily manufactured while allowing easy realization of adhesive properties.

The second adhesive layer 23 may have a thickness ranging from 5 μm to 100 μm, preferably from 10 μm to 50 μm. Within this thickness range of the second adhesive layer 23, reworking can be easily performed and adhesive residue is unlikely to remain.

The transparent acrylic resin layer 22 may have a thickness of 5 μm to 150 μm, preferably 25 μm to 75 μm. If the thickness of the transparent acrylic resin layer 22 is less than 5 μm, the transparent acrylic resin layer has insufficient mechanical strength, causing deterioration in durability, wear resistance and impact resistance, and cannot be easily manufactured. If the thickness of the transparent acrylic resin layer 22 exceeds 150 μm, the thickness of the display device according to the present invention is disadvantageously increased, and winding of the transparent acrylic resin layer is not easy when the adhesive layers are attached to upper and lower sides thereof in practice.

The transparent acrylic resin layer 22 may have an optical transmittance of 92% or more. The optical transmittance of the transparent acrylic resin layer 22 has substantial influence on overall optical transmittance of the double-sided adhesive sheet.

Further, at least one surface of the transparent acrylic resin layer 22 adjoining the first adhesive layer 21 or the second adhesive layer 23 may be subjected to at least one selected from among primer treatment, corona treatment, plasma treatment, heat treatment, and hard coating treatment.

The double-sided adhesive sheet may have a CIE lightness index L* value of 97 or more and a b* value of 0.5 or less, based on JIS Z 8729. The CIE color system is based upon physically measured values and psychometric values obtained based upon human visual perception of observers, wherein in the L*a*b* color system, L* indicates lightness and a* and b* are chromaticity coordinates. Here, a* and b* indicate color directions: +a* represents the red direction, −a* represents the green direction, +b* represents the yellow direction, and −b* represents the blue direction. Generally, as b* decreases, that is, as b* moves from yellow to blue, the quality of the touch panel improves.

Further, the double-sided adhesive sheet 20 has a haze value of 1% or less.

The double-sided adhesive sheet 20 has a total thickness of 50 μm to 500 μm, preferably in the range of 100 μm to 300 μm. This thickness corresponds to the thickness of a pressure sensitive adhesive layer between the touch panel and a display device module. If the thickness of the double-sided adhesive sheet 20 is less than 50 μm, it is difficult to evacuate air therefrom, and if the thickness thereof exceeds 500 μm, an undesirable increase in thickness of electronic devices will be incurred.

Another embodiment of the present invention relates to a touch panel type display device including the double-sided adhesive sheet. FIG. 3 is a schematic sectional view of a touch panel type display device in accordance with one embodiment of the present invention. Referring to FIG. 3, a display device 100 for a touch panel according to one embodiment of the invention is constituted by a touch panel 111 and a display device module 113 coupled to each other by a pressure sensitive adhesive layer 112, wherein the double-sided adhesive sheet 120 is interposed between the touch panel 111 and the display device module 113.

Specifically, the first adhesive layer 121 of the double-sided adhesive sheet 120 is bonded to an overall surface of the touch panel 111 except for a portion of the touch panel 111 adjoining the pressure sensitive adhesive layer 112, and the second adhesive layer 123 of the double-sided adhesive sheet 120 is bonded to an overall surface of the display device module 113 except for a portion of the display device module 113 adjoining the pressure sensitive adhesive layer 112 such that an air gap is not formed between the touch panel 111 and the display device module 113, improving visibility. Here, since the adhesive layers 121, 123 on both sides of the double-sided adhesive sheet 120 have different peel strengths, it is possible to provide a display device which is separable and re-bondable with respect to the touch panel or the display device module.

The touch panel 121 may be any type of touch panel including a resistive touch panel, optical touch panel, capacitive touch panel, ultrasound touch panel, and the like, without being limited thereto, and a lower substrate of the touch panel may be a substrate formed of an organic or inorganic material, for example, polycarbonate, glass, polymethyl methacrylate (PMMA), SUS, and the like.

The display device module 123 may be any one selected from among liquid crystal displays, plasma displays, organic electroluminescent displays, electrophoretic displays and other equivalent displays, without being limited thereto. These displays include a polarizing film at the uppermost layer thereof, wherein the polarizing film is formed of triacetylcellulose (TAC), cyclopolyolefin, acrylate resins, and the like.

According to one embodiment of the invention, a method for securing a touch panel to a display device module includes bonding the second adhesive layer of the double-sided adhesive sheet to the display device module, and bonding the first adhesive layer of the double-sided adhesive sheet to the touch panel, without being limited thereto.

Advantageous Effects

The double-sided adhesive sheet according to embodiments of the present invention includes a transparent acrylic resin layer as a base layer, and adhesive layers formed on upper and lower sides of the transparent acrylic resin layer and having different peel strengths, whereby the double-sided adhesive sheet can be separated and recycled even after being attached to the touch panel and the display device module. Further, the display device includes the double-sided adhesive sheet attached between the touch panel and the display device module, preventing formation of an air gap and thereby improving visibility while minimizing differences in index of refraction.

DESCRIPTION OF DRAWINGS

FIG. 1 is a schematic sectional view of a conventional touch panel type display device;

FIG. 2 is a schematic sectional view of a double-sided adhesive sheet in accordance with one embodiment of the present invention; and FIG. 3 is a schematic sectional view of a touch panel type display device in accordance with one embodiment of the present invention.

MODE FOR INVENTION

The present invention will be described in more detail with reference to examples, and it should be understood that the following examples are provided for illustration only and are not to be construed in any way as limiting the scope of the present invention.

PREPARATIVE EXAMPLE 1

Preparation of First Adhesive Layer

To prepare a first adhesive layer, 90 parts by weight of an ethylhexyl acrylate monomer and 10 parts by weight of an acrylic acid monomer were mixed in a 1 L reactor, and a heat initiator was added to the mixture, followed by heating the mixture to 60° C., thereby preparing a partially polymerized resin having a viscosity of 1000 to 5000 cps. Then, 1.0 part by weight of a photoinitiator (Irgacure 184) and 0.2 parts by weight of hexanediol diacrylate were mixed with the partially polymerized resin. Then, the mixture was coated on a PET release film and dried for 3 minutes under a fluorescent blacklight produced by Osram Sylvania Inc., thereby forming adhesive sheets having thicknesses of 130 μm and 180 μm, respectively.

PREPARATIVE EXAMPLE 2

Preparation of Second Adhesive Layer

To prepare a second adhesive layer, 98 parts by weight of ethylhexyl acrylate and 2 parts by weight of hydroxy ethyl acrylate were mixed in ethyl acetate, and then a heat initiator was added to the mixture, followed by heating the mixture to 60° C., thereby preparing a polymer adhesive resin having a molecular weight of 500,000. Then, the polymer adhesive resin was mixed with 1.0 part by weight of a toluene diisocyanate curing agent, followed by coating the mixture on a PET release film by taking drying-induced reduction in thickness into account. Then, the prepared film was dried at 110° C. in a hot air oven for 1 minute, and left at 40° C. for 1 day, thereby preparing adhesive sheets having thicknesses of 8 μm and 20 μm, respectively.

PREPARATIVE EXAMPLE 3

Preparation of Transparent Acrylic Resin Layer

To prepare a transparent acryl film as a base film, an urethane acrylate oligomer (molecular weight: 1000) and an isobonyl acrylate monomer were mixed in a ratio of 50:50, and 1.0 part by weight of a photoinitiator (Irgacure 184) was added to the mixture, which in turn was coated to thicknesses of 12 µm, 50 µm and 100 µm on a PET release film and dried for 3 minutes under a fluorescent blacklight produced by Osram Sylvania Inc., thereby forming an acryl film.

COMPARATIVE PREPARATION EXAMPLE 1

Preparation of First Adhesive Layer

To prepare a first adhesive layer, 80 parts by weight of an ethylhexyl acrylate monomer, 18 parts by weight of glycidyl methacrylate and 2 parts by weight of an acrylic acid monomer were mixed in a 1 L reactor, and a heat initiator was added to the mixture, followed by heating the mixture to 60° C., thereby preparing a partially polymerized resin having a viscosity of 1000 to 5000 cps. Then, 1.0 part by weight of a photoinitiator (Irgacure 184) and 0.2 parts by weight of hexanediol diacrylate were mixed with the partially polymerized resin. Then, the mixture was coated on a PET release film and dried for 3 minutes under a fluorescent blacklight produced by Osram Sylvania Inc., thereby forming an adhesive sheet having a thickness of 130 µm.

COMPARATIVE PREPARATION EXAMPLE 2

Preparation of Second Adhesive Layer

To prepare a second adhesive layer, 60 parts by weight of ethylhexyl acrylate, 30 parts by weight of silicone acrylate and 10 parts by weight of an acrylic acid monomer were mixed in ethyl acetate, and then a heat initiator was added to the mixture, followed by heating the mixture to 60° C., thereby preparing a polymer adhesive resin having a molecular weight of 500,000. Then, the polymer adhesive resin is mixed with 0.6 parts by weight of an aziridine curing agent having two functional groups, followed by coating the mixture on a PET release film by taking drying-induced reduction in thickness into account. Then, the prepared film was dried at 110° C. in a hot air oven for 1 minute, and left at 40° C. for 1 day, thereby preparing an adhesive sheet having a thickness of 20 µm.

EXAMPLE 1

A 180 µm thick acrylic adhesive layer prepared in Preparative Example 1 was transferred to one side of a 50 µm thick transparent acryl film prepared in Preparative Example 3 through roll lamination to form a first adhesive layer, and a 20 µm thick acrylic adhesive layer prepared in Preparative Example 2 was transferred to the other side of the transparent acryl film through roll lamination to form a second adhesive layer, thereby preparing a double-sided adhesive sheet having a total thickness of 250 µm.

EXAMPLE 2

A double-sided adhesive sheet was prepared in the same manner as in Example 1 except that a 100 µm thick transparent acryl film prepared in Preparative Example 3 was used to prepare a double-sided adhesive sheet having a total thickness of 300 µm.

EXAMPLE 3

A double-sided adhesive sheet was prepared in the same manner as in Example 1 except that a 12 µm thick transparent acryl film prepared in Preparative Example 3, a 130 µm thick first adhesive layer prepared in Preparative Example 1, and a 8 µm thick second layer prepared in Preparative Example 2 were used to prepare a double-sided adhesive sheet having a total thickness of 150 µm.

COMPARATIVE EXAMPLE 1

Instead of using the transparent acryl film of Preparative Example 3, a 180 µm thick first adhesive layer prepared in Preparative Example 1 and a 20 µm thick second layer prepared in Preparative Example 2 were transferred through roll lamination, thereby preparing a double-sided adhesive sheet having a total thickness of 200 µm.

COMPARATIVE EXAMPLE 2

A double-sided adhesive sheet was prepared in the same manner as in Example 1 except that a 50 µm thick polyethylene terephthalate (PET) film was used as the base film instead of using the transparent acryl film of Preparative Example 3.

COMPARATIVE EXAMPLE 3

A double-sided adhesive sheet was prepared in the same manner as in Example 1 except that a 180 µm thick first adhesive layer prepared in Comparative Preparation Example 1 was used as the first adhesive layer.

COMPARATIVE EXAMPLE 4

A double-sided adhesive sheet was prepared in the same manner as in Example 2 except that a 20 µm thick second adhesive layer prepared in Comparative Preparation Example 2 was used as the second adhesive layer.

EXPERIMENTAL EXAMPLE

Measurement of Physical Properties

1) Evaluation of Visibility

In each of the double-sided adhesive sheets prepared in Examples 1 to 3 and Comparative Examples 1 to 4, the indices of refraction of the first adhesive layer, the transparent acrylic resin layer and the second adhesive layer were measured (using an Abbe Refractometer) and differences therebetween were analyzed to evaluate improvement in visibility through suppression of optical distortion. Good improvement in visibility is indicated by O, normal improvement in visibility is indicated by Δ, and insufficient improvement in visibility is indicated by X.

2) Measurement of Peel Strength

For each of the double-sided adhesive sheets prepared in Examples 1 to 3 and Comparative Examples 1 to 4, one side of the adhesive sheet facing the first adhesive layer was bonded to an about 1 mm thick polycarbonate film by reciprocating a 2 kg roller twice to prepare a specimen, which in turn was subjected to measurement of peel strength, and the other side of the adhesive sheet facing the second adhesive layer was bonded to a triacetylcellulose (TAC) polarizing film in the same manner to prepare a specimen, which in turn was subjected to measurement of peel strength.

180° peel strength was measured by peeling the double-sided adhesive sheet from the polycarbonate and TAC films at 23° C. and at a peeling rate of 300 mm/min and a peeling angle of 180° using a small tensile tester (Texture Analyzer, TA instrument). Results are shown in Table 1.

3) Evaluation of Reworkability (Repeelability)

For each of the double-sided adhesive sheets prepared in Examples 1 to 3 and Comparative Examples 1 to 4, one side of the adhesive sheet facing the first adhesive layer was bonded to an about 1 mm thick polycarbonate film by reciprocating a 2 kg roller twice and the other side of the adhesive sheet facing the second adhesive layer was bonded to an about 1 mm thick glass surface on a triacetylcellulose (TAC) polarizing film, followed by complete removal of bubbles from the specimen in an autoclave at 60° C. and 5 atm. for 30 minutes.

Then, the specimen was left in an oven at 60° C. for 1 minute, and within 1 minute after removing the specimen from the oven, whether the second adhesive layer could be naturally separated from the specimen by hand was determined Easy separation is indicated by ○, normal separation is indicated by Δ, and difficult separation is indicated by ×. Results are shown in Table 1.

4) Measurement of CIE L*a*b* Color System

After attaching the adhesive sheet onto a 1.1 mm thick soda lime glass using SHIMADZU 3700N and removing the PET release film, the color system was measured. For measurement, each sample had a size of 10 cm×10 cm and an average value was obtained by measuring at 5 points on the sample.

5) Measurement of Haze

A haze value (%) of each of the double-sided adhesive sheets prepared in Examples 1 to 3 and Comparative Examples 1 to 3 was measured using a Haze-Gard plus device produced by BYK Gardner Inc., according to ASTM D1003. Results are shown in Table 2.

6) Measurement of Optical Transmittance (Ts)

Optical transmittance was measured in an optical transmittance mode according to the same method as in measurement of the color system.

TABLE 2

|  | Ts (%) | Haze (%) | L* | a* | b* |
|---|---|---|---|---|---|
| Ex. 1 | 93.5 | 0.99 | 97.3 | −0.03 | 0.26 |
| Ex. 2 | 94.8 | 0.68 | 97.5 | −0.04 | 0.15 |
| Ex. 3 | 93.1 | 0.86 | 98.1 | −0.02 | 0.33 |
| Com. Ex. 1 | 94.9 | 0.65 | 95.2 | 0.01 | 0.19 |
| Com. Ex. 2 | 89.5 | 1.56 | 97.0 | −0.03 | 0.68 |
| Com. Ex. 3 | 92.4 | 1.01 | 96.8 | −0.01 | 0.45 |
| Com. Ex. 4 | 91.6 | 1.15 | 96.9 | −0.03 | 0.46 |

From the results of the experimental results for examples and comparative examples, it can be seen that the double-sided adhesive sheets according to the examples of the present invention exhibit superior reworkability to the double-sided adhesive sheets prepared in the comparative examples, and had a minimized difference in index of refraction between the first adhesive layer, the transparent acrylic resin layer and the second adhesive layer and thus did not deteriorate optical characteristics of the display device.

Although some embodiments have been described herein, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A double-sided adhesive sheet sequentially including a first adhesive layer, a transparent acrylic resin layer and a second adhesive layer,
   wherein each of the first adhesive layer and the second adhesive layer comprises an acrylic adhesive;
   the first adhesive layer is disposed to adjoin a touch panel;
   the second adhesive layer is disposed to adjoin a display device module; and
   adhesive strength between the first adhesive layer and the touch panel is higher than adhesive strength between the second adhesive layer and the display device module,
   wherein the first adhesive layer, the transparent acrylic resin layer and the second adhesive layer have an index of refraction ranging from 1.44 to 1.55,
   wherein the first adhesive layer has a 180° peel strength of 800 g/in to 3000 g/in with respect to a substrate at a peeling rate of 300 mm/min and a temperature of 23°

TABLE 1

|  | Base film | Index of refraction of base film | Index of refraction of first adhesive layer | Index of refraction of second adhesive layer | Visibility | 180° peel strength of first adhesive layer (g/in) | 180° peel strength of second adhesive layer (g/in) | Reworkability |
|---|---|---|---|---|---|---|---|---|
| Ex. 1 | Acryl | 1.49 | 1.48 | 1.46 | ○ | 1250 | 10 | ○ |
| Ex. 2 | Acryl | 1.49 | 1.46 | 1.45 | ○ | 1107 | 5 | ○ |
| Ex. 3 | Acryl | 1.49 | 1.48 | 1.46 | ○ | 965 | 5 | ○ |
| Com. Ex. 1 | — | — | 1.48 | 1.46 | X | 3865 | 90 | Δ |
| Com. Ex. 2 | PET | 1.62 | 1.48 | 1.45 | X | 706 | 89 | Δ |
| Com. Ex. 3 | Acryl | 1.49 | 1.57 | 1.46 | Δ | 3209 | 65 | X |
| Com. Ex. 4 | Acryl | 1.49 | 1.48 | 1.42 | Δ | 2252 | 176 | X |

C., and the second adhesive layer has a 180° peel strength of 0 to 80 g/in with respect to a polarizing film at a peeling speed of 300 mm/min and a temperature of 23° C., wherein the first adhesive layer has a thickness of 130 μm to 180 μm and the second adhesive layer has a thickness of 8 μm to 20 μm, and wherein the double-sided adhesive sheet has a total thickness of 100 μm to 300 μm.

2. The double-sided adhesive sheet according to claim 1, wherein the acrylic adhesive included in the first adhesive layer comprises an acrylate monomer having a $C_1$-$C_{12}$ alkyl group and a functional group-containing copolymerizable monomer, wherein the functional group-containing monomer is present in an amount of 5 wt % or more in the acrylic copolymer.

3. The double-sided adhesive sheet according to claim 1, wherein the acrylic adhesive included in the second adhesive layer comprises an acrylate monomer having a $C_1$-$C_{12}$ alkyl group and a functional group-containing copolymerizable monomer, wherein the functional group-containing monomer is present in an amount of 5 wt % or less in the acrylic copolymer.

4. The double-sided adhesive sheet according to claim 1, wherein the first adhesive layer is formed of a solventless adhesive and the second adhesive layer is formed of a solvent adhesive.

5. The double-sided adhesive sheet according to claim 1, wherein the second adhesive layer is formed of an acrylic monomer having at least one functional group selected from the group consisting of hydroxyl and amide functional groups.

6. The double-sided adhesive sheet according to claim 1, wherein the transparent acrylic resin layer has an optical transmittance of 92% or more.

7. The double-sided adhesive sheet according to claim 1, wherein at least one surface of the transparent acrylic resin layer adjoining the first adhesive layer or the second adhesive layer is subjected to at least one of primer treatment, corona treatment, plasma treatment, heat treatment, and hard coating treatment.

8. The double-sided adhesive sheet according to claim 1, wherein the double-sided adhesive sheet has a CIE lightness index L* value of 97 or more and a b* value of 0.5 or less, based on JIS Z 8729.

9. The double-sided adhesive sheet according to claim 1, wherein the double-sided adhesive sheet has a haze value of 1% or less.

10. A touch panel display device including:
a touch panel;
a display module;
the double-sided adhesive sheet according to claim 1, disposed between the touch panel and the display module;
the first pressure sensitive adhesive layer disposed between the touch panel and the display module and attached to a first side of the double-sided adhesive sheet; and
the second pressure sensitive adhesive layer disposed between the touch panel and the display module and attached to a second side of the double-sided adhesive sheet,
wherein
the first adhesive layer of the double-sided adhesive sheet is bonded to an overall surface of the touch panel,
the second adhesive layer of the double-sided adhesive sheet is bonded to an overall surface of the display device module, and
the double-sided adhesive sheet is peelable and re-bondable with respect to the touch panel or the display device module.

11. A method of securing a touch panel type display device module, comprising:
bonding the second adhesive layer of the double-sided adhesive sheet according to claim 1 to the display device module; and
bonding the first adhesive layer of the double-sided adhesive sheet to the touch panel.

12. The double-sided adhesive sheet according to claim 1, wherein at least one surface of the transparent acrylic resin layer adjoining the first adhesive layer or the second adhesive layer is subjected to plasma treatment.

13. The double-sided adhesive sheet according to claim 1, wherein at least one surface of the transparent acrylic resin layer adjoining the first adhesive layer or the second adhesive layer is subjected to hard coating treatment.

14. The double-sided adhesive sheet according to claim 1, wherein the transparent acrylic resin layer is formed of at least one selected from the group consisting of methyl methacrylate, urethane acrylate, epoxy acrylate, silicone acrylate, ethylhexyl acrylate, butyl acrylate, ethyl acrylate, isobonyl acrylate, cyclohexyl methacrylate, glycidyl methacrylate, glycidyl acrylate, behenyl acrylate, ethyl acrylate, lauryl acrylate, stearyl acrylate, acrylic acid, hydroxyethyl acrylate, hydroxybutyl acrylate, hydroxyethyl methacrylate, phenoxy acrylate, methylacrylate, and hexanediol diacrylate.

* * * * *